3,017,237
CELLULOSE DERIVATIVE AND METHOD OF
PREPARING SAME
Austin L. Bullock and John D. Guthrie, New Orleans, La., assignors to the United States of America as represented by the Secretary of Agriculture
No Drawing. Filed Sept. 13, 1960, Ser. No. 55,808
9 Claims. (Cl. 8—120)
(Granted under Title 35, U.S. Code (1952), sec. 266)

A non-exclusive, irrevocable, royalty-free license in the invention herein described, throughout the world for all purposes of the United States Government, with the power to grant sublicenses for such purposes, is hereby granted to the Government of the United States of America.

The invention relates to a crosslinked fibrous cellulose derivative containing free, reactive carboxyl groups and to a process for producing same.

It is well known that highly substituted cellulose derivatives that contain substituents having hydrophilic groups such as carboxymethylcellulose tend to swell, gelatinize or even dissolve in either dilute acids, dilute alkalies or water. This tendency to swell, gelatinize or dissolve when highly substituted prevents the use of such derivatives in many cases where insolubility and a low degree of swelling are important.

We have discovered that a cellulose derivative containing both crosslinks between cellulose chains and free, reactive carboxyl groups may be highly substituted and at the same time may be insoluble and highly resistant to swelling. This derivative may be prepared from either granular or fibrous cellulose, from yarn or from fabrics. The cellulose may be obtained from wood pulp, cotton, hemp, ramie or it may be a regenerated cellulose such as rayon. The cellulose derivative provides an improved absorbent and ion exchange material of value in biochemical separations and in other chemical processes. The derivative, when produced in the form of yarn or fabric, provides a useful textile material having enhanced affinity for basic dyes.

The cellulose derivative may be prepared by reacting cellulose with a gem-dihaloacetic acid, for example dichloroacetic acid, or with its sodium salt in the presence of sodium hydroxide, best results being obtained when an excess of the alkali is used. The pure acid may be used or it may be diluted with a suitable solvent, such as water or acetone. A 20% to a 40% aqueous sodium hydroxide solution is preferred, however the concentration of the sodium hydroxide solution may vary widely so long as it is present in excess. The sodium hydroxide may be applied prior to the acid or simultaneously with the salt of the acid, but is usually applied after the cellulosic material has been impregnated with the acid. When the cellulosic material is treated as a fabric or as a yarn, impregnation is preferably done by padding. In these cases the reaction is completed by curing at an elevated temperature, preferably in the range of from 80° C. to 120° C. At curing temperatures lower than about 80° C. the extent of the reaction is limited and at curing temperatures higher than about 120° C. excessive yellowing of the sample occurs. Curing times of from 5 to 15 minutes are preferred.

In treating cellulosic materials such as cotton linters or wood pulp, impregnation is preferably accomplished by soaking the cellulosic material in the acid. Treatment is then completed by filtering off excess acid and slowly adding the acid impregnated material to an excess of sodium hydroxide solution, stirring to avoid localized overheating. If the pure acid or a concentrated solution of the acid is used for impregnation, the heat of neutralization may be sufficient to complete the reaction. If the salt is used or if the acid and the sodium hydroxide are mixed prior to impregnation, curing at an elevated temperature is necessary.

After the reaction is completed, the cellulosic material is washed until free of alkali and dried in any desired manner.

That the cellulosic derivative is crosslinked is indicated by its resistance to solution in cuprammonium hydroxide solution (a cellulose solvent). The presence of acidic groups is indicated by increased affinity for such dyes as methylene blue and is confirmed by titration with a standard base after having been placed in the free acid form by rinsing with dilute HCl and then washing free of ionic chlorine.

The derivative may be used as an ion exchange medium in the same form in which is was prepared or it may be cut or ground so as to give particles of any desired size.

The following examples, in which parts and percentages are by weight unless otherwise indicated, are illustrative of the invention.

*Example 1*

A sample of bleached $80^2$ cotton print cloth was padded through dichloroacetic acid using a medium squeeze roll pressure and was then padded twice through 37.5% sodium hydroxide solution using a light squeeze roll pressure. The sample was then placed in an oven at 100° C. and cured for 10 minutes. The sample was then washed until free of alkali and dried. Ion exchange value was found to be 1.2 meq./gm.

*Example 2*

A solution was made by mixing 24 parts of dichloroacetic acid with 24 parts of water and, while cooling in an ice bath, stirring in 75 parts of 40% sodium hydroxide solution. This solution was used to pad a sample of bleached $80^2$ cotton print cloth to a wet pickup of 135%. The sample was then placed in an oven at 100° C. and cured for 10 minutes. After washing until free of alkali and drying, a 7.5% weight increase was noted. The sample was dyed to a dark shade by methylene blue and had an ion exchange value of 0.86 meq./gm.

*Example 3*

A sample of bleached $80^2$ cotton print cloth was padded with a 60% solution of the sodium salt of dichloroacetic acid to a wet pickup of 113%. It was then padded with a 40% solution of sodium hydroxide to a total wet pickup of 183%. The sample was then cured in an oven at 100° C. for 10 minutes. It was washed free of alkali and dried. The product dyed darkly with methylene blue and had an ion exchange value of 1.4 meq./gm.

*Example 4*

A sample of purified cotton linters was wet out with dichloroacetic acid and the excess acid filtered off. The wet linters were then covered with hot 50% sodium hydroxide solution, stirring and mixing until no further reaction was apparent. The cellulosic product was filtered and washed until free of alkali and dried. Ion exchange value of the product was found to be 1.4 meq./gm.

When monochloroacetic acid was used in place of dichloroacetic acid the product swelled excessively, dissolved when washed and was valueless as a fibrous ion exchange material. The useful upper range of fibrous cellulosic ion exchange materials currently available made by means of monochloroacetic acid is less than 1.0 milliequivalent per gram.

*Example 5*

A sample of purified cotton linters was soaked in 40% sodium hydroxide solution and the excess solution filtered off. The linters were then extracted twice with acetone and slowly added with stirring to a 50% (by volume) solution of dichloroacetic acid in acetone. The sample was allowed to soak for an hour after apparent reaction had ceased. The product was then washed free of alkali with water and air dried. The product had an ion exchange value of 0.80 meq./gm.

Example 6

A sample of worsted viscose rayon was padded with dichloroacetic acid using a maximum squeeze roll pressure. Without drying, it was then padded twice through a 40% sodium hydroxide solution using a minimum squeeze roll pressure. The sample was cured in an oven at about 90° C. for 10 minutes. It was then washed free of caustic and dried. Although greatly swollen when wet, the sample retained its fabric form. It was dyed darkly by methylene blue and had an ion exchange value of 1.34 meq./gm.

Example 7

A sample of purified wood pulp was soaked in dichloroacetic acid and the excess acid removed by filtration. The moist pulp was then slowly stirred into a 40% sodium hydroxide solution. After 1 hour it was removed by filtration, washed free of caustic and dried. The product had an ion exchange value of 1.731 meq./gm. and was only slightly swollen by either water or 4% sodium hydroxide solution. It was suitable for use in an ion-exchange column.

A sample of carboxymethyl cellulose prepared from the same pulp in a similar manner using 50% monochloroacetic acid had an ion exchange value of 1.079 meq./gm. and was found to swell greatly in water and to dissolve in 4% sodium hydroxide solution. This carboxymethyl cellulose sample was not suitable for use in an ion-exchange column.

We claim:

1. A process for producing a crosslinked, fibrous, cellulose derivative containing carboxyl groups, said cellulose derivative characterized by insolubility and resistance to swelling in water comprising reacting fibrous cellulose with dichloroacetic acid in the presence of an excess of sodium hydroxide.

2. A process for the preparation of a crosslinked fibrous, cellulosic derivative containing carboxyl groups comprising the following steps: wetting fibrous cellulose at room temperature with an aqueous solution of a reagent selected from the group consisting of dichloroacetic acid and the sodium salt of dichloroacetic acid, said aqueous solution containing sodium hydroxide in an amount sufficient to maintain basicity throughout the subsequent reaction; heating the wetted cellulose at a temperature of from 80 to 120° C. for a period of from 5 to 15 minutes, the shorter time intervals being employed with the higher temperature.

3. The process of claim 2 wherein the reagent is the sodium salt of dichloroacetic acid.

4. The process of claim 2 in which the reagent is dichloroacetic acid.

5. The process of claim 4 wherein the cellulose is a cotton cellulosic fabric.

6. A process for the preparation of a crosslinked fibrous, cellulosic derivative containing free carboxyl groups comprising the following steps: wetting the fibrous cellulose at room temperature with an aqueous solution of dichloroacetic acid; treating the wetted fibrous cellulose with an aqueous solution containing sufficient sodium hydroxide to maintain the basicity of the cellulose throughout the subsequent reaction at from room temperature to 100° C. for a period of from 5 minutes to 2 hours, the longer time intervals being employed with the lower temperatures; washing the treated fibrous cellulose free from sodium hydroxide with water.

7. The process of claim 6 wherein the fibrous cellulose is cotton linters.

8. The process of claim 6 wherein the fibrous cellulose is wood pulp.

9. The process of claim 6 wherein the fibrous cellulose is viscose rayon.

No references cited.